United States Patent [19]
Hulbert et al.

[11] Patent Number: 5,793,796
[45] Date of Patent: Aug. 11, 1998

[54] APPARATUS FOR USE IN EQUIPMENT PROVIDING A DIGITAL RADIO LINK BETWEEN A FIXED AND A MOBILE RADIO UNIT

[75] Inventors: Anthony Peter Hulbert, Southampton; David Peter Chandler, Hampshire, both of Great Britain

[73] Assignee: Roke Manor Research Limited, Hampshire, England

[21] Appl. No.: 362,483

[22] PCT Filed: Mar. 22, 1994

[86] PCT No.: PCT/GB94/00585

§ 371 Date: Feb. 16, 1995

§ 102(e) Date: Feb. 16, 1995

[87] PCT Pub. No.: WO94/28640

PCT Pub. Date: Dec. 8, 1994

[30] Foreign Application Priority Data

Jun. 2, 1993 [GB] United Kingdom .................. 9311373
Aug. 9, 1993 [GB] United Kingdom .................. 9316489

[51] Int. Cl.$^6$ .............................................. H04B 1/707
[52] U.S. Cl. ................................... 375/206; 375/208
[58] Field of Search ...................... 375/200, 206–208, 375/330, 343, 347; 370/342, 441, 515

[56] References Cited

U.S. PATENT DOCUMENTS

| | | | |
|---|---|---|---|
| 4,665,404 | 5/1987 | Christy et al. ................. | 375/210 X |
| 5,224,122 | 6/1993 | Bruckert ......................... | 375/200 |
| 5,329,547 | 7/1994 | Ling ............................... | 375/206 X |
| 5,361,276 | 11/1994 | Subramanian .................. | 375/200 |
| 5,404,377 | 4/1995 | Moses ............................ | 375/200 |
| 5,448,600 | 9/1995 | Lucas ............................. | 375/200 X |

OTHER PUBLICATIONS

Adaptive Spread Spectrum Receiver for Mobile Communications by G Povey, J Thompson, R Pringle and P Grant, IEE Colloquium on DSP Applications in Communications London, UK, 22 Mar. 1993, pp. 1–5.

Performance Assessment of a BPSK CDMA System using an Urban Radio Channel Model by W Tanik, A Yanartas, S Koc, COST 231 TD(91), Leidschendam, Sep. 1991, pp. 1–17.

Increased CDMA System Capacity through Adaptive Cochannel Interference Regeneration and Cancellation by R Mowbray, R Pringle, P Grant, IEE Proceedings–1, vol. 139, No. 5, Oct. 1992, pp. 515–524.

Mulitpath and Co–Channel CDMA Interference Cancellation by S Mowbray, R Pringle and P Grant, IEEE Second International Symposium on Spread Spectrum Techniques and Applications (ISSSTA'92) Yokohama, Japan, Nov. 29 – Dec. 2, 1992, pp. 83–86.

"Microcellular Direct–Sequence Spread–Spectrum Radio System Using N–Path RAKE Receiver", U. Grob et al., IEEE Journal on Selected Areas in Communication, vol. 8, No. 5, Jun. 1990, pp. 772–780.

(List continued on next page.)

*Primary Examiner*—Young T. Tse
*Attorney, Agent, or Firm*—Hill & Simpson

[57] ABSTRACT

Conventional Rake receivers for spread spectrum signals are typically restricted in the number of multipath components they can usefully combine. The present apparatus for combines all the useful multipatlh components in a received signal with modest complexity. Digital correlators are provided over the multipath delay spread of the signal at predetermined intervals and their outputs are maximal ratio combined. With close to rectangular transmission received filters, almost all the entire signal energy can be recovered at the output of the combiner even though no attempt is made to accurately to align any of the correlators onto a specific multipath component.

23 Claims, 6 Drawing Sheets

OTHER PUBLICATIONS

"New Antimultipath Technique for Spread Spectrum Receivers", R.S. Mowbray et al., Electronics Letters, vol. 29, No. 5, Mar. 4, 1993, pp. 456–458.

"Digital Spread–Spectrum Multipath–Diversity Receiver for Indoor Communications", H. Kaufmann et al., Vehicular Technology Society 42nd VTS Conference, Denver, May 10–13, 1992, vol. 2, pp. 1038–1041.

"Performance of a RAKE Demodulator with Pre–decision Multipath Thresholding", R.E. Kane, Jr. et al., Milcom 90, IEEE Military Communications Conference, 1990, vol. 3, pp. 1025–1029.

Great Britian Patent Application No. 9304901.3.

APPARATUS FOR USE IN EQUIPMENT PROVIDING A DIGITAL RADIO LINK BETWEEN A FIXED AND A MOBILE RADIO UNIT

BACKGROUND OF THE INVENTION

The present invention relates to apparatus for use in equipment providing a digital radio link using direct sequence spread spectrum between a fixed and mobile radio unit.

Equipment for providing such a radio link is described in Great Britain Patent Application Number 9304901.3. This application describes the use of Wiener-like filters for providing good estimates of the amplitude of the inphase I, the quadrature phase Q, components of, for example, a spread spectrum pilot signal.

Spread spectrum signals provide the possibility of obtaining excellent immunity), to multipath fading through resolving the individual, time separated, multipath components and optimally combining them. The common approach for achieving this is to use a 'Rake' receiver as is familiar to those versed in the art. Such a receiver assigns de-spreading correlators to each of the dominant multipath components and synchronizes them for maximum de-spread energy. For each of the Rake 'fingers' the phase and amplitude of the de-spread components is estimated and used to apply optimum amplitude weighting and phase alignment prior to addition (combining). The weighted sum of the multipath components will experience considerably less fading than any of the individual components so that a diversity gain is obtained.

One problem with the normal implementation of such a receiver is that the delay spread of the signal must be perpetually searched to determine whether a Rake finger should be assigned to a new, stronger, multipath component. If the channel is changing rapidly, significant loss in performance can result from there being too long a delay between a stronger multipath component appearing and it being assigned to a Rake finger.

Additionally some channels may consist of a large number of quite small multipath components. If all or most of these are not assigned to a Rake finger then a significant amount of signal energy may be wasted for the purposes of reception although it will still appear as interference to the reception of the spread spectrum transmission sharing the carrier frequency in a Code Division Multiple Access (CDMA) sense. The problem with these low level components is that, unless they are being measured continuously, it is not possible to assess with adequate accuracy, when and at what level they should be included in the combining output. The requirement to allow inclusion of a large number of multipath components could lead to the need for permanent provision of hardware for a large number of Rake fingers and a very fast searcher to assign the Rake fingers efficiently and rapidly.

Conventionally, every Rake finger would require a spread spectrum decorrelator, nominally timed aligned to the multipath component. Two identical spread spectrum decorrelators, assigned in time symmetrically either side of the first correlator would be required. The time offset of these correlators will be typically plus or minus one quarter or one eighth of a chip interval. The chip interval is the spread bit period, ie. bit period/spreading factor. The sampling of the signal at four or eight times the chip rate becomes essential. These correlators together with the first form of code lock loop in which the energy on the three correlator outputs are compared and the timing of the code generators for the correlators are adjusted so that the energy on the centre correlator is always maximised, as familiar to those versed in the art. A phase estimator (typically a phase lock loop) to obtain the carrier phase of the signal for the purposes of phase compensation prior to combining, and, an amplitude estimator to apply optimum weighting to the signals prior to combining would also be required. The major complexity in terms of operations is in the three spectrum decorrelators.

The searcher would typically consist of a number of sliding correlators arranged together to cover the overall delay spread of the signal, perhaps sliding their timing in steps of half chips. If optimal performance in assigning Rake fingers to very weak multipath components is to be achieved then ideally the searcher would examine all multipatlh components in parallel. This would require a digital matched filter with a delay coverage equal to the maximum anticipated delay spread for the signal.

SUMMARY OF THE INVENTION

An object of the present invention is to provide means for combining the functions of the searcher and the Rake fingers whilst reducing the sample rate to one sample per chip and greatly reducing the hardware complexity.

According to the present invention there is provided apparatus for use in equipment providing a digital radio link using direct sequence spread spectrum between a fixed and mobile radio unit, said apparatus comprising a Rake receiver including a plurality of digital correlators each providing a Rake finger, in which a block of digital correlation functions cover a contiguous span of spreading code phases of the same order as the maximum delay spread of a signal to be received, and adder means arranged to combine energy from each multipath component from several correlators.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Firstly, consider a bank of digital correlators i=0 to n−1, each fed with a code shifted by one chip interval from the previous one. The total cover delay span is equal to N chips where N is chosen to give a delay span at least equal to the largest signal delay spread likely to be encountered in practice. Let it be assumed that the code has been synchronised such that the correlations performed on the end digital correlators de-spread all of the significant multipatlh components over the delay spread of the signal, ie. the delay coverage of the correlator bank is centred on the delay spread of the signal.

Each digital correlator serves to measure the signal power received at its timed position and also serves as a Rake finger for reception of that signal component whenever it is required to be combined. It will be appreciated that when using only one sample per chip it is not possible to align any digital correlator (or Rake finger) exactly, or even closely, onto a particular multipath component. This might seem to imply that significant losses in signal energy must arise. However, provided the transmission received filters of the spread spectrum link are suitably designed, this need not be the case.

Figure 1:
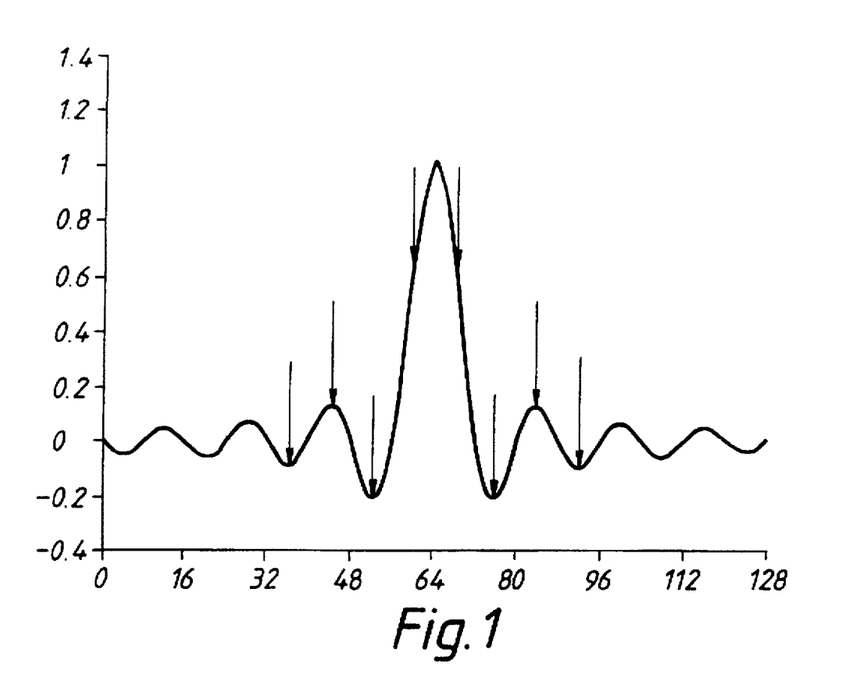
FIG. 1 shows a graph of non-optimal sampling of a correlation function.

If the transmission receive filters, which may be of Nyquist type, have been designed as linear phase with a very sharp (near to rectangular frequency in response) then very little energy will be aliased through sampling even at as low a rate as one sample per chip. This raises the question as to how the energy is to be recovered. Let the position be considered where the multipath component is timed to arrive exactly half way between the optimum correlation times of a pair of adjacent correlators (this represents the worst case). Because of the auto correlation function of the received signal, imposed on the multipath component by the combination of the transmission received filter functions, both correlators will output some energy (in this particular case equal energy) corresponding(, to the multipath components arriving half way between them. Similarly, the further out correlators either side of the multipath component will output smaller energy levels. This effect is shown in FIG. 1. In FIG. 1 the curve shows the correlation function for a signal passed through an ideal rectangular filter. The arrows represent the timings of the correlators with significant energy. If the signal components from all correlator outputs (extending an arbitrary long time in both directions) Were optimally combined then all of the signal energy corresponding to the multipath component could be recovered in spite of the incorrect sample timing. In practice, none of the ideals are satisfied. Thus tile filter is not an ideal rectangular filter; combining is never optimum and only a few correlator outputs can usefully be combined. Nevertheless, experiments have shown that for practical filters, realistic combining and using the Optimum (small) number of correlator outputs, the average loss due to non-optimum combining is typically less than 1 dB even for a very large number of multipath components. This is partly because the performance is determined by an average of overall conditions and it is very unlikely that all multipath components will appear at exactly the worst sample points simultaneously.

Thus, by having a continuous bank of Rake fingers, the requirement for achieving optimum sample timing is removed. This has the following advantages. As mentioned above, sampling can take place at one sample per chip. This may permit significant cost/power consumption reductions on the analogue/digital convertors and initial digital signal processing operations. Each Rake finger now requires only one correlator. Code lock loop circuitry is not required for the individual Rake fingers. Since only one Rake correlator is required per chip offset, a modest number of correlators can cover the delay spread of the signal. Since the Rake correlators cover the entire delay spread of the signal they can also serve as the searcher. Essentially hardware/software associated with each Rake correlator independently decides whether the correlator output should be included in the combiner sum.

Figure 2:
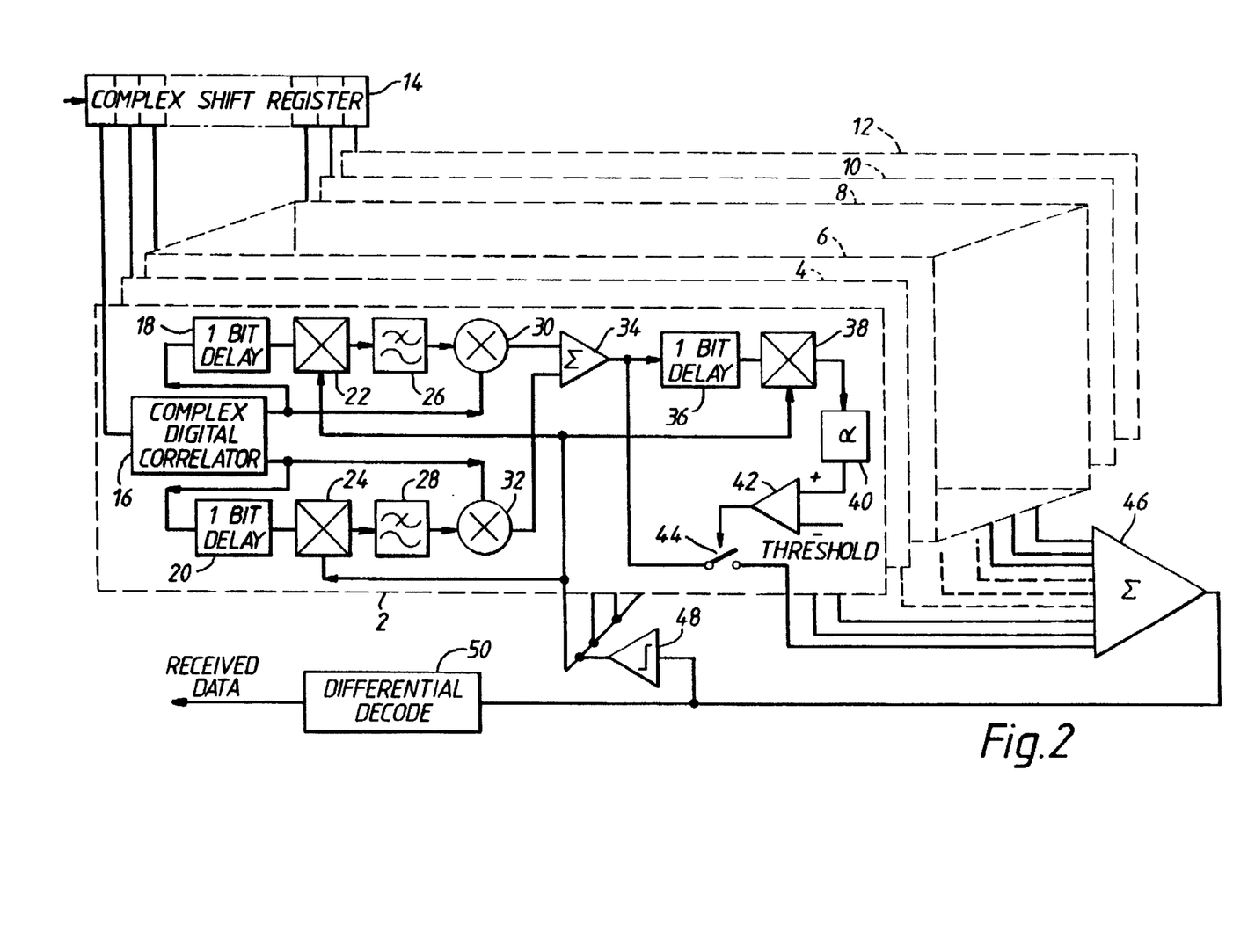
FIG. 2 shows a block diagram of a parallel Rake DBPSK receiver.

Referring to FIG.2, a parallel Rake differential binary phase shift keying (DBPSK) receiver is shown in block diagram form.

In FIG.2 there is shown a plurality of parallel Rake fingers 2, 4, 6, 8, 10 and 12. It will be appreciated that each Rake finger includes the circuit elements which will be described hereinafter with reference to Rake finger 2.

A complex shift register 14 receives the incoming data and has each stage connected to an input of a respective one of the complex digital correlators 16 in each Rake finger. The complex digital correlator 16 has two outputs, each is connected to an input of a one bit delay device 18, 20 and is further connected to an input of a linear mutltiplier 30, 32. An output of the one bit delay device 18 is connected to an input of a half linear multiplier 22 which has an output connected to an input of a Wiener-like filter 26. The output of the filter 26 is connected to a further input of the linear multiplier 30. Similarly, the Output of the one bit delay device 20 is connected to an input of a half linear multiplier 24, the output of which is connected to the input of a Wiener-like filter 28. The output of the Wienier-like filter 28 is connected to a further input of the linear multiplier 32. The outputs from the linear multipliers 30, 32 are connected to a respective input of an adder circuit 34, the output of which is connected to an input of a one bit delay circuit 36. The Output of the one bit delay circuit 36 is connected to an input of a further half linear multiplier 38, the output of which is connected to an input of an alpha tracker circuit 40. The alpha tracker circuit is the digital equivalent of an RC low pass filter. It is an integrator with leakage where the output, $Sn = \alpha.I_n + (1-\alpha) S_{n-1}$ ($I_n$ is the nth input sample). The output of the alpha tracker circuit 40 is connected to an input of a threshold circuit 42. Each Rake finger has an output line connected to an adder circuit 46. This output line has the output of the adder circuit 34 connected to it by a switching arrangement 44 which is operated under the control of the threshold circuit 42. The output of the adder circuit 46 is connected to input of a limiting circuit 48 and to the input of a differential decode circuit 50. The limiting circuit 48 generates an output which is fed to a second input of the half linear multipliers 22, 24 and 38. The differential decode circuit 50 generates at an output the received data signal.

The operation of the circuit shown in FIG. 2 will now be described.

The receiver shown in the FIG. 2 is specifically for a differential binary phase shift keying (DBPSK) receiver. Each Rake finger 2–12 is subjected to a successive one chip delayed version of the signal as that signal is passed through the complex shift register 14. The complex digital correlator 16 is used to de-spread the I and Q components of that part of the signal arriving at the relevant time. The I component of the signal is passed to the one bit delay circuit 18 and the Q component is passed to the one bit delay circuit 20. The I and Q components are then passed through respective half linear multipliers 22, 24 which remove the modulation corresponding to the previous bit from the components. The I and Q components are then fed to the Wiener-like filters 26, 28. These filters give good estimates of the I and Q values corresponding to the received signal element at the time one bit earlier than the input. This prediction compensates for the input delay circuit. Multiplication of the I and Q components of the signal with the corresponding I and Q estimates of the unmodulated signal is carried out in the respective linear multipliers 30, 32 and the outputs of these multipliers are summed in the summation circuit 34 to give a phase corrected and amplitude weighted version of the signal available for combining.

At this point in time it is not clear whether this output should be applied to the adder circuit 46 since it may consist only of noise. If the estimating Wienier-like filters were perfect they would indicate that the true signal components I and Q were in fact zero and the previous multiplication would have produced a zero output. However, the estimator outputs are never perfect and will always output some noise even when there is no signal component. Thus a second stage is required to determine whether a signal component adequate to justify inclusion is in fact present. The signal for potential inclusion is taken and delayed by a one bit period by the delay circuit 36 and the data for the previous bit is again stripped off by the linear multipliers 30, 32. The output at this stage is now a noisy measure of the energy in the correlator output in the previous bit interval. This is fed to an averaging filter 40. In this example the averaging filter is an alpha tracker. The output of the filter 40 is then compared with a threshold by threshold circuit 42 to determine when the signal component should be included in the over all combiner. The adder circuit 46 produces an overall output which is hard limited to produce the modulation for stripping off in the next demodulation frame. This is accomplished by the limiting circuit 48 which receives the output of the adder circuit 46 and the output of the hard limiter is connected to the half linear multipliers 22, 24, 38. When the signal first appeared at the output of the limiting circuit 48 it will be random. Depending upon the number of Rake fingers and the overall characteristics of the signal, the receiver may be able to boot strap itself from this condition. Alternatively, each long transmission (consisting of several transmission frames) can be prefaced with a period of transmitting known data. During this period the locally known data is used to derive the modulation for stripping and the Stripping input is switched over to the Rake output limiting circuit only when the known data is replaced with unknown data.

The output of the adder circuit 46 is differentially decoded in the conventional fashion by multiplying each sample output by the previous one. This process is carried by the differential decode circuit 50.

If the multiplier is linear on both inputs, ie. several bits precision, then the amplitude of the output is a suitable soft decision metric for use in conjunction with soft decision error correction decoding if error control coding has been applied to the transmit data.

As an alternative to the above described implementation, an alternative implementation will now be described with reference to FIG. 3 which shows a serial Rake differential phase shift keying (DPSK) receiver.

Figure 3:
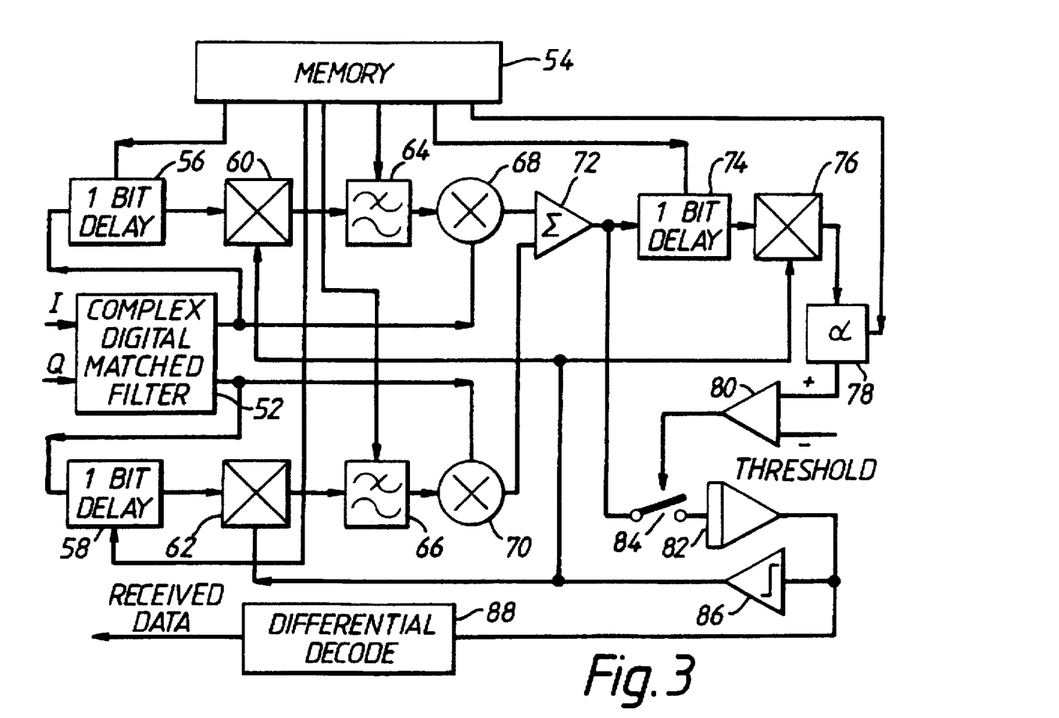
FIG. 3 shows a block diagram of a serial Rake DPSK receiver.

With reference to FIG. 3, the complex digital match filter 52 receives the inphase and quadrature phase signals on the respective lines I, Q. The filter 52 has two output lines one of which is connected to an input of a one bit delay device 56 and the other is connected to an input of a one bit delay device 58. The output of the one bit delay device 56 is connected to an input of a half linear multiplier 60 the output of which is connected to an input of a Wiener-like filter 64. The output of the Wiener-like filter 64 is connected to an input of a linear multiplier 68, the output of which is connected to an input of an adder circuit 72. The output of the one bit delay device 58 is connected to an input of a further half lineal multiplier 62, the output of which is connected to an input of a Wiener-like filter 66. The output of the Wiener-like filter 66 is connected to an input of a linear multiplier 70, the output of which is connected to a further input of the adder circuit 72. The output of the adder circuit 72 is connected to an input of a further one bit delay circuit 74 and to an input of switching arrangement 84. An output of the one bit delay device 74 is connected to a further half linear multiplier 76, the output of which is connected to an alpha tracker circuit 78. An output of the alpha tracker circuit 78 is connected to an input of a threshold device 80, the output of which is used to control the switching arrangement 84. The switching arrangement 84 is connected to the input of an integrating circuit 82. An output of the integrating circuit 82 is connected to an input of a limiting device 86 and to the input of a differential decode circuit 88. The differential decode circuit 88 generates the received data. An output of the limiting device 86 is connected to a further input of the half linear multipliers 60, 62, 76.

A memory 54 is connected to a further input of the one bit delay devices 56, 58 and 74, and is also connected to a further input of the Wiener-like filters 64 and 66, and to a further input of the alpha tracker circuit 78.

The operation of the circuit shown in FIG. 3 will now be described.

The circuit produces an output for each chip time interval within the delay window for each chip. The basic operation is identical to that of FIG. 2 except that as each new output is produced for each successive chip offset it may, depending on the average signal strength received for that offset be fed to an accumulator, shown as an integrator 82. The I components of the signal are passed via the one bit delay circuit 56, the half linear multiplier 60, the Wiener-like filter 64, the lineal multiplier 68 and the adder circuit 72. The Q components of the signal are passed via the one bit delay circuit 58, the half linear multiplier 62, the Wiener-like filter 66, the linear multiplier 70 and the adder circuit 72. When the end of the span for receipt of the current bit is reached the output of the adder circuit 72 is hard clipped for the purposes of stripping the data and differentially is decoded to provide the over-all receiver output. The control of the output of the adder circuit 72 is achieved by the switching arrangement 84 which is controlled by the threshold circuit 80, the alpha tracker 78, the further half linear multiplier 76 and one bit delay device 74 as described with reference to FIG. 2. The output of the integrating circuit 82 is applied to the hard limiting device 86 the output of which is fed back to the further inputs of the half linear multipliers 60, 62, 76. The output of the integrating circuit 82 is also passed to the differential decode circuit 88 to generate the received output data.

The memory 54 is needed in this embodiment because the contents of each of the Wiener-like filters and the alpha tracker circuit, as well as the one bit delay devices must be reinstated with the contents which they had when de-spreading the corresponding chip one bit earlier The inclusion of the memory 54 enables the Wiener-like filters and the alpha tracker circuit to behave as though many mole have been provided.

Figure 4:
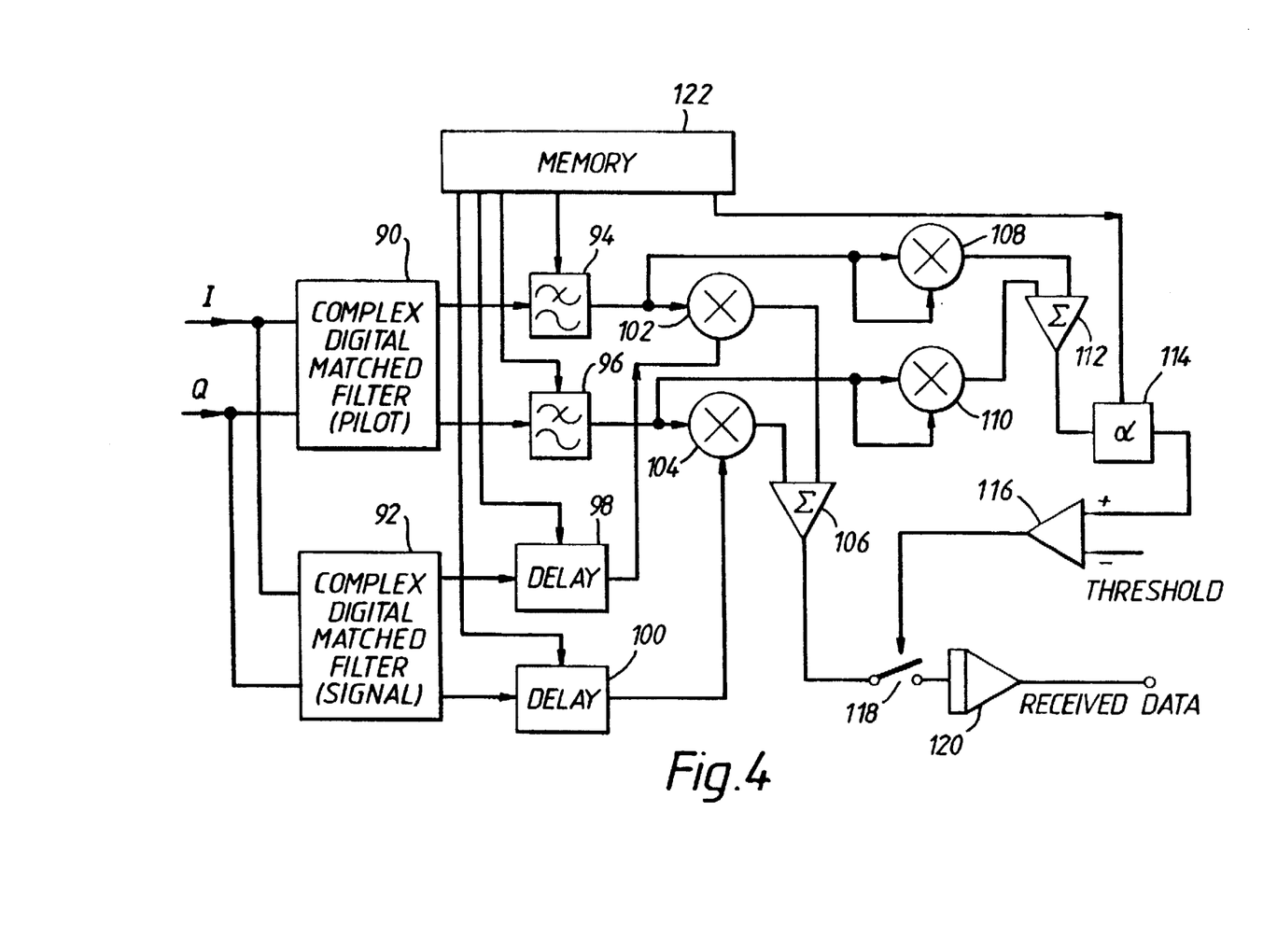
FIG. 4 shows a block diagram of a serial Rake BPSK receiver with a pilot signal.

Referring to FIG. 4, a binary phase shift keying (BPSK) receiver will now be described suitable for use with a pilot signal. FIG. 4 represents a serial approach to such a receiver and includes a complex digital matched filter 90 for the pilot signal, and a complex digital matched filter 92 for the data signal. The I and Q components of the input signal are each applied to respective inputs of the filters 90, 92. The filter 90 has two outputs each connected to a respective Wiener-like filter 94, 96. The outputs of the Wiener-like filters are connected to an input of linear multipliers 102 and 104 respectively and also to first and second inputs of further linear multipliers 108, 110 respectively. An output from each of the linear multipliers 102, 104 are applied to a respective input of an adder circuit 106, the output of which is connected to one side of the switching arrangement 118. Another side of the switching arrangement 118 is connected to an input of an integrating circuit 120 the output of which generates the received data signals.

An output of the multipliers 108, 110 are each connected to a respective input of a further adder circuit 112, the output of which is connected to an input of an alpha tracker circuit 114. The output of the alpha tracker circuit 114 is connected to an input of the threshold circuit 116, the output of which controls the switching arrangement 118. A memory 112 is connected to the Wiener-like filters 94, 96, the delay circuits 98, 100 and to the alpha tracker circuit 114 to reinstate their contents which they had when de-spreading the corresponding chip one bit earlier.

The operation of the receiver shown in FIG. 4 will now be described. It will appreciated that while the description is applicable to a serial receiver a BPSK receiver could be embodied in parallel form.

Separate correlators are required for de-spreading the I and Q components of both the pilot and the signal for each one chip interval over the delay spread of the signal. Correlators will be essentially the same but will use different chip sequences. On the pilot output path the I and Q components are applied to the Wiener-like filters 94, 96 respectively, which have a symmetrical structure and a delay. This provides more reliable estimates of the carrier components at the particular delay being de-spread by averaging over a longer period and by avoiding the need to predict. Note that since the pilot is unmodulated, there is no need to strip off the data. The estimates of the carrier I and Q components for the relevant point in the delay spread are used to compensate the phase and amplitude of a suitably delayed despread signal. The contents of the filters need to be reinstated from the memory 122 for each chip position within a bit, so here for the case of a BPSK receives the same requirement applies. The outputs of the Wiener-like filters 94, 96 and the outputs from the delay circuits 98, 100 are, for the I and Q components respectively, combined by the linear multipliers 102, 104. The output signals from the lineal multipliers 102, 104 are applied to an adder circuit 106 the output of which is connected by the switching arrangement 18 to the integrating circuit 120. The control of the switching arrangement 118 is governed by a threshold circuit 116 which receives an output signal from the alpha tracker circuit 114. The input to the alpha tracker circuit is derived by the adder circuit 112 which receives the output signals from two further linear multipliers 108, 110 which receives at both their respective inputs the output from the Wiener-like filters 94, 96 respectively.

As mentioned above, the output from the adder circuit 106 is fed via the switching arrangement 118 to the integrating circuit 120 under the control of the threshold circuit 116 which generates a conditional on average signal level. The integrating circuit 120 serves to perform the combining across the Rake components.

The signal measurement for the thresholding is obtained from the pilot by the further pair of multiplying circuits 108, 110. This is because the pilot signal will generally be stronger than the data signal so can give a more acculate (noise free) estimate of the signal level. The embodiment described with reference to FIG. 4 does not require the stripping of data because the pilot signal is available without any data thus the effects of any decision errors can be avoided.

In cases where the data signal is stronger than the pilot signal, this might apply for high data rate transmissions, it might be advantageous to perform the signal measurement on the basis of the data signal in the same manner as described with reference to FIG. 3.

Figure 5:
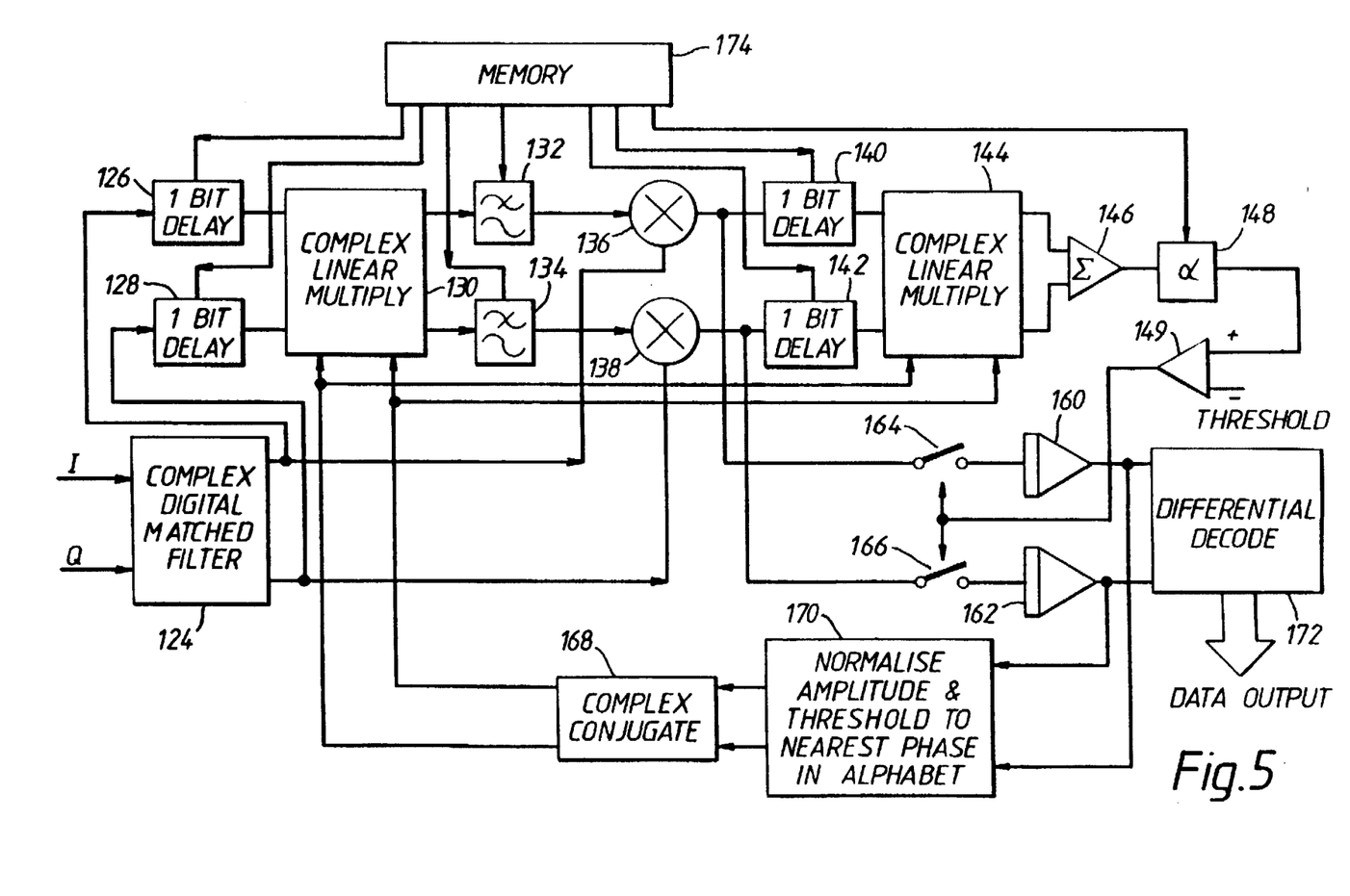
FIG. 5 shows a serial Rake MDPSK receiver.

With reference to FIG. 5, a multi phase differential phase shift keying receiver will now be described.

A complex digital matched filter 124 receives the inphase, I signal, and the quadrature phase, Q signal. The filter 124 has two output lines each being connected to the first input of a respective linear multiplier 136, 138. The output lines of the filter 124 are also connected to an input of a one bit delay circuit 126, 128 respectively. The outputs of the one bit delay circuits are connected to an input of a complex linear multiplying circuit 130 respectively which has two output lines connected to an input of a Wiener-like filter 132, 134 respectively. The output from each of the Wiener-like filters 132, 134 are connected to a second input of the linear multipliers 136, 138 respectively. The output from the linear multipliers 136, 138 are connected to an input of a further one bit delay circuit 140, 142 respectively, the outputs of which are connected to an input of a further complex linear multiplying circuit 144 respectively. The complex lineal multiplying circuit 144 has two output lines connected to an input of an adder circuit 146, the output of which is connected to an alpha tracker circuit 148. The one bit delay circuits 126, 128, 140, 142, the Wiener-like filters 132, 134 and the alpha tracker circuit 148 each have an additional input connected to a memory 174 for refreshing purposes. An output from the alpha tracker circuit 148 is connected to an input of a threshold detector circuit 149 the output of which is connected in a manner to control two switching arrangements 164, 166. The switching arrangements 164, 166 are connected to an output of the linear multiplying circuit 136, 138 respectively, and are used to apply that output to an input of a integrating circuit 160, 162 respectively. An output from each integrating circuit is applied to a differential decode circuit 172 which generates the data output signal. The outputs from the integrating circuits 160, 162 are connected to an input of a normalised amplitude and threshold to nearest phase in alphabet circuit 170 respectively. This circuit has two output lines connected to an input of a complex conjugate circuit 168 respectively, which has two output lines each being connected to a further input of the complex linear multiplying circuits 130, 144 respectively.

The operation of the receiver shown in FIG. 5 will now be described.

The basic operation is the same as for the DBSPK receiver except that now the stripping for the pilot extraction must be performed by a complex linear multiplier 130. Moreover, after phase and amplitude compensation, there is signal energy on both the I and Q components so Rake combining must be performed separately for both. For this purpose two separate integrating circuits 160, 162 are provided which perform combining across the different multipath components for both the I and Q signals. Measurement of the signal energy for the purpose of thresholding now requires removal of the data from the phase compensated signal, and this is achieved by using a further complex linear multiplier 144 with the data estimate. The two switching arrangements 164, 166 ale used to control the input of the integrating circuits 160, 162. For data stripping the output of the integrating circuits 160, 162 is normalised to give a complex number containing only phase information. This operation is carried out by the circuit 170. After normalisation the phase is rounded to the nearest phase in the modulation alphabet, again by circuit 170. Data stripping requires complex multiplications with the complex conjugate of this data, so the output from the circuit 170 is applied to the complex conjugate circuit 168. Since differential modulation is used the user data must be obtained by a differential decoder 172. The current output of the integrating circuits 160, 162 is referred to as the complex number $Z_n$ and the previous output, $Z_{n-1}$ and the data differentially encoded between the nth and the n–1th signalling intervals can be obtained by selecting the phase in the modulation alphabet nearest to the phase of $Z_n.Z*n-1$.

Figure 6:
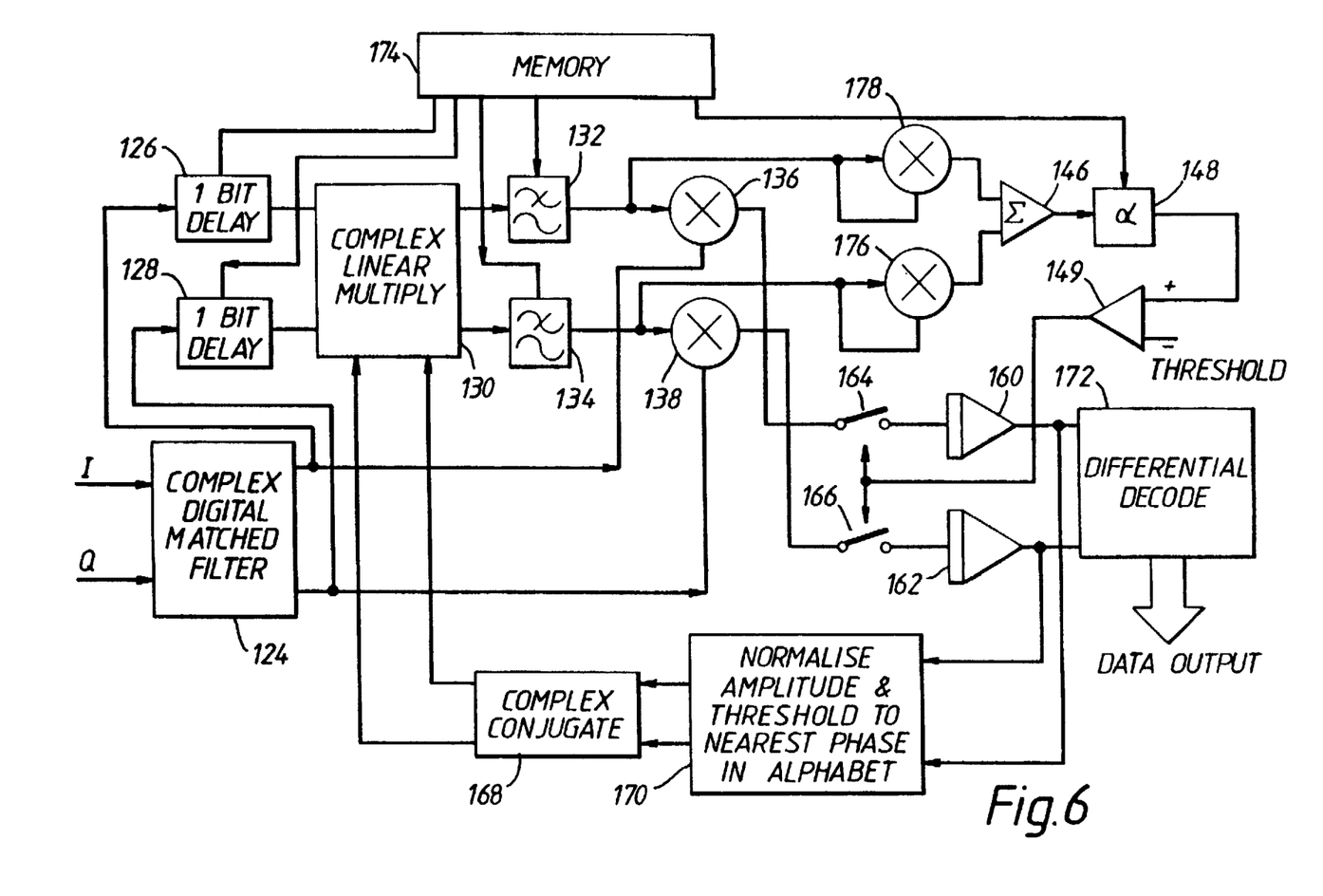
FIG. 6 shows a serial Rake MDPSK receiver having alternative energy measurement.

The signal measurement for purposes of thresholding may more conveniently be described using the architecture shown in FIG. 6.

FIG. 6 is similar to FIG. 5 and like components have been given like designations and their function are as described with reference to FIG. 5.

It will be noted that the difference between the two figures is the removal of the one bit delay circuits 140, 142 and the second complex linear multiplier circuit 144. This circuitry has been replaced by two further linear multipliers 174, 176 which receive the output from the Wiener-like filters 132, 134 at their two inputs, respectively. The outputs of the further linear multiplying circuits 174 176 are connected to the adder circuit 146.

The energy measurement is performed by squaring the estimates on the I and Q signal channels directly. Because of the averaging involved in the Wiener-like filtering it is no longer necessary to perform the second multiplication as frequently as once per bit.

Figure 7:
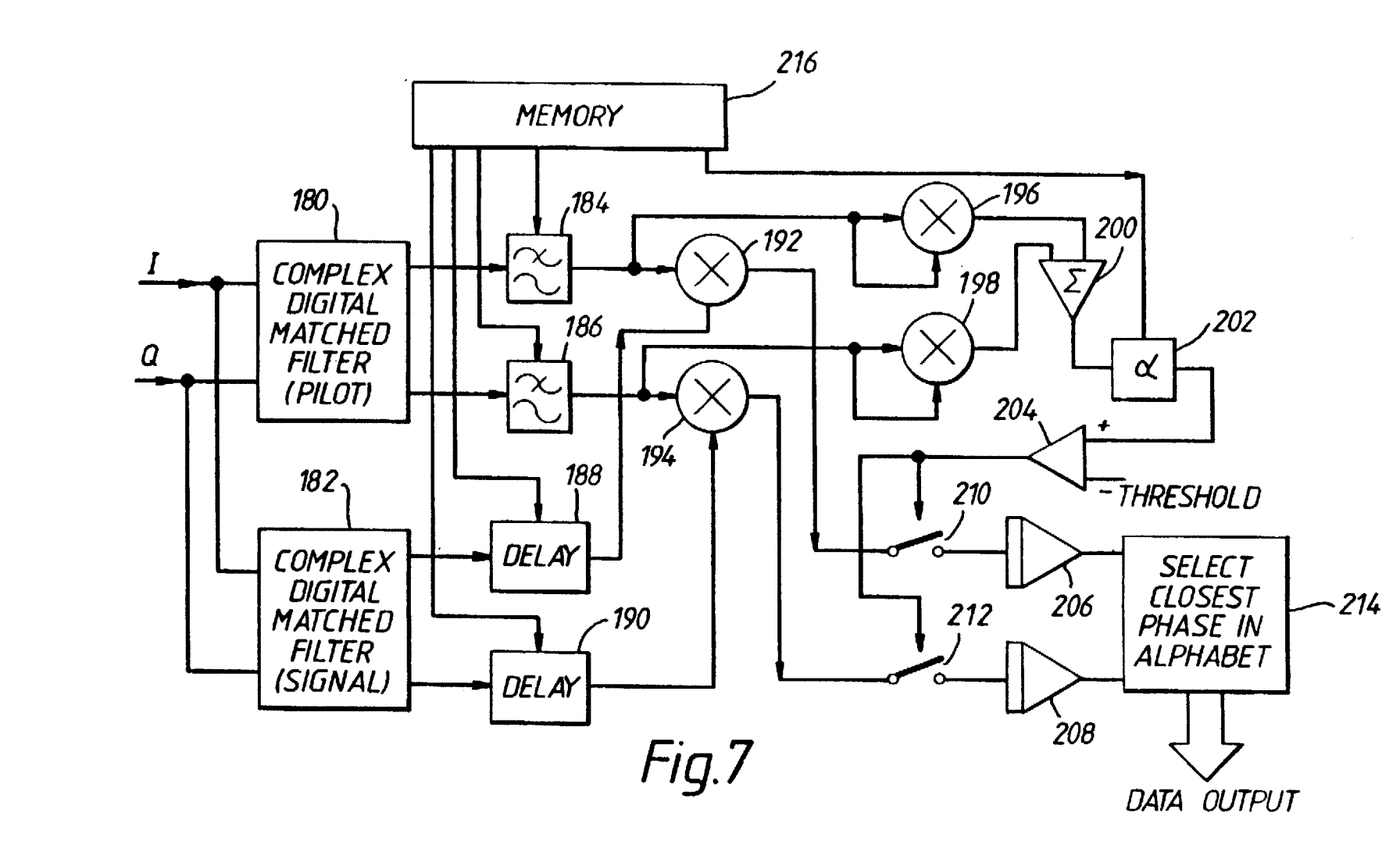
FIG. 7 shows a block diagram of a serial Rake MPSK receiver.

For a general case of multiple phase shift keying (MPSK) having a pilot signal the possible architecture is shown in FIG. 7.

FIG. 7 shows a comprehensive Rake MPSK receivers The receiver includes a first complex digital matched filter 180 for the pilot signal and a second complex digital matched filter 182 for the data signal. The inphase I, and quadrature phase Q, components of the input signal are applied to both filters. The pilot filter 180 has two output lines each connected to a Wiener-like filter 184, 186 respectively. The data signal filter 182 has two output lines each connected an input of a respective delay circuit 188, 190. An output from the Wiener-like filter 184 and an output from the delay circuit 188 is connected to an input of a linear multiplier 192 respectively. The output from the Wiener-like filter 186 and from the delay circuit 190 is connected to an input of a linear multiplier 194 respectively. Two further linear multipliers 196, 198 each receive at their inputs the output from a respective one of the Wiener-like filters 184, 186. The outputs from the linear multipliers 192, 194 are connected to an input of a switching arrangement 210, 212 respectively. The output from the further linear multipliers 196, 198 are applied to an input of an adder circuit 200 respectively. The output of the adder circuit 200 is connected to an input of an alpha tracker circuit 202 the output of which is applied to an input of a threshold detecting circuit 204. The output from the threshold detecting circuit 204 is used to control the switching arrangements 210, 212. Two integrating circuits 206, 208 have their input connected to a further input of a switching arrangement 210, 212 respectively, and the outputs from the integrating circuits are applied to a circuit 214 which selects the closest phase in the alphabet to generate the data output.

The only difference between the multi level PSK receiver and the BPSK receiver is that the inphase I and quadrature phase Q components must be handled separately in the combiners and the demodulation is performed by selecting the phase in the modulation alphabet which is closest to the phase of the received signal. If the received signal had been forward error correction encoded in the transmit Source then the complex signal at the output of the two integrating circuits 206, 208 would be used directly, providing self decision information.

The above receivers as described with reference to FIGS. 2 to 7 assume that the spreading code has already been synchronised to the extent that all of the significant multipath components fall within the span of the de-spreading functions related to the bank of correlators.

Initial synchronisation may be achieved in a number of ways. It is assumed that, for the pilotless case an unmodulation signal is transmitted during the initial synchronisation phase. Because the bank of correlators covers a wide delay spread in parallel, it may be used in a block search strategy in which a set of code phases is applied to the correlators and the measuring circuits examined for significant energy. If no significant energy is found in any of the energy measurement circuits, the set of code phases applied to the correlators is stepped forwards or backwards to coffer the next contiguous (non-overlapping) range of delays and so on until either a signal is found or the entire uncertainty window is covered. In the latter case the set of code phases will be reset to the beginning or end of the uncertainty window. Alternatively the search strategy could run backwards from this point. When at least one correlator with significant energy is found, the primariy search strategy is stopped. At this stage part of the signal delay spread is covered by the code span of the bank of correlators. A secondary finding strategy is then required to perform the initial centering of the code span onto the delay spread of the signal. Once all the significant multipath components have been detected, the earliest and latest significant multipath components detected with the time spread window of the receiver are identified. At this stage it is possible that multipath components exist either side of the time spread window, but not both sides. The only way to be certain that the correct alignment is achieved is to test both hypotheses in turn as follows:

1) Shift the code phase so that the earliest path found moves close to the start of the coverage span. After a period of averaging, a new latest path will arise. The difference in times (correlator numbers) between the earliest and the last paths gives the captured delay spread for this case.

2) Shift the code phase so that the original latest path found moves close to the end of the coverage span. After a period of averaging, a new earliest path will arise. The difference in times between the earliest and last paths gives the captured delay spread for this case.

The code timing is finally aligned in the position of case 1 or case 2 according to which gave the greater captured delay spread.

The shifting of code phases can be achieved by the movement of pointers to locations in the memory. There is no need physically to copy the contents of filters or delay circuit. In the parallel case it becomes necessary either to shift the contents of the various filters and delay circuit or, effectively, to rewire the connections between each Rake finger and the overall shift register.

Once initial synchronisation has been achieved it is necessary to maintain overall synchronisation to keep the code coverage of the receiver centred on the delay spread of the signal. This can be achieved as follows:

1) If the time spread window of the receiver is large enough so that it can be guaranteed that it will always exceed the signal delay spread by a significant margin then timing control can be exerted by regularly updating the code timings to keep the current earliest and latest found signal components centred on the time spread window.

2) If the above cannot be guaranteed it will be necessary to search outside the window with a separate sliding correlator. However, a simple single correlator should suffice for this case since the centering of the overall delay spread should change very slowly, being dependent only on overall changes in path length.

It will be readily appreciated by those skilled in the art that the receiver architectures described above can readily be extended to a dual pass receiver architecture such as that described in Great Britain Patent Application Number 9309748.3.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An apparatus for use in equipment providing a digital radio link using direct sequence spread spectrum between a fixed radio unit and a mobile radio unit, said apparatus comprising: a Rake receiver having a plurality of Rake fingers respectively connected to a stage of a shift register means, through which a received spread spectrum signal is passed, each of said plurality of Rake fingers having a digital correlator means coupled to the corresponding stage of the shift register and arranged to generate inphase and quadrature phase components of a despread signal representative of said received spread spectrum signal by correlating said received signal with a locally generated spreading code, said digital correlator means feeding said inphase component on a first output line, to a first input of first multiplying means and to a first input of second multiplying means via first delay means, and feeding said quadrature phase component on a second output line to a first input of fourth multiplying means and to a first input of a fifth multiplying means via a second delay means, said second multiplying means having an output connected to a first Wiener-like filter having an output connected to a second input of said first multiplying means, said fifth multiplying means having an output connected to a second Wiener-like filter having an output connected to a second input of said fourth multiplying means, said first and fourth multiplying means having respective outputs connected to first adder means having an output connected to a switching arrangement, and the output of said first adder means also connected to a third multiplying means via third delay means, an output of said third multiplying means being connected to an input of tracking means having an output connected to threshold means for generating an output signal for controlling said switching arrangement, and, upon operation of said switching arrangement the output from said first adder means being connected to an input of a receiver adder means which receives a signal from each of said Rake fingers, said receiver adder means generating an output signal representative of a detected symbol which is applied to a limiting means for generating a feedback control signal fed to each of the second, third and fifth multiplying means, said output from said receiver adder circuit being also applied to a decoding circuit for generating a received data output signal corresponding to said detected symbol.

2. The apparatus as claimed in claim 1, wherein the decoding circuit is a differential decode circuit, the Rake receiver being thereby arranged to handle differential binary phase shift keying signals.

3. The apparatus as claimed in claim 1, wherein a phase representative of a temporal displacement of said locally generated spreading code within each of said correlator means is stepped forward and backward to cover a contiguous range of delays, until either a signal is found or an entire predetermined range is covered, so as to synchronize said Rake receiver to said spread spectrum signal.

4. The apparatus as claimed in claim 3, wherein synchronization is provided by at least one sliding correlator arranged to scan outside a desired range.

5. The apparatus as claimed in claim 1, wherein in the Rake receiver each of the Wiener-like filters are dual pass Wiener-like filters.

6. A method of recovering data from a received spread spectrum radio signal comprising the steps of:

(I) generating a despread representation of said received signal by correlating said received spread spectrum signal with a locally generated reference signal appertaining to the spreading code used to spread the spectrum of said spread spectrum signal, (ii) storing a current sample of said despread signal, which sample is representative of a bit of said data being detected, (iii) using a pair of Wiener-like filters to generate a sample of a channel impulse response through which said received spread spectrum signal has passed, in accordance with an earlier sample of said despread signal scaled by a feedback control signal, (iv) scaling said current despread signal sample with said sample of said channel impulse response generated in step (iii), thereby generating an estimate of a detected symbol, (v) comparing the amplitude of said sample of said channel impulse response generated in step (iii) with a predetermined threshold, (vi) adding the detected symbol sample to an accumulated total, if the amplitude of said sample of said channel impulse response is greater than said threshold, (vii) generating said feedback control signal appertaining to said estimate of said detected symbol manipulated so that when scaled with said current despread signal sample effects of modulation are removed, thereby providing in combination with said Wiener-like filters and said sample of said channel impulse from said earlier sample of said despread signal.

7. A method of recovering data from a received spread spectrum radio signal as claimed in claim 6, wherein steps (i) to (vii) are repeated for each of a plurality of temporal shifts of said locally generated reference signal in step (i) and for each temporal position adding the detected symbol sample to said accumulated total in step (vi).

8. An apparatus for use in equipment providing a digital radio link using direct sequence spread spectrum between a fixed radio unit and a mobile radio unit, said apparatus comprising: only one Rake finger comprising a digital matched filter means arranged to receive inphase and quadrature phase components of an input signal, and arranged to generate inphase and quadrature phase components of a despread representation of said spread spectrum signal, said digital matched filter means feeding said inphase component on a first output line connected to a first input of first multiplying means and to an input of second multiplying means via a first delay circuit, said digital matched filter means feeding said quadrature component on a second output line connected to a first input of fourth multiplying means and to a first input of a fifth multiplying means via a second delay means, said second multiplying means having an output connected to an input of a first Wiener-like filter, the output of which is connected to a second input of said first multiplying means, said fifth multiplying means having an output connected to a second Wiener-like filter having an output connected to a second input of said fourth multiplying means, an output of each of said first and fourth multiplying means being connected to an input of a first adder means, the output of which is connected via a third delay means to third multiplying means having an output connected to an input of tracking means, an output of said tracking means being connected to threshold means, an output of which being used to control a switching arrangement, said switching arrangement being connected to the output of said first adder means and being arranged to switch an output signal generated by said first adder means being representative of a detected symbol, to an integrating means, the output of which being connected to an input of a limiting means for generating a feedback control signal fed to a second input of each of said seconds, third and fifth multiplying means, said output from said integrating means being further applied to a decode circuit which generates a received data output signal corresponding to said detected symbol.

9. The apparatus as claimed in claim 8, wherein the decode circuit is a differential decode circuit, the Rake finer being thereby arranged to handle differential binary phase shift keying signals.

10. The apparatus as claimed in claim 8, wherein each of the Wiener-like filters are dual pass Wiener-like filters.

11. The apparatus as claimed in claim 8, wherein a memory means is connected to each of said delay means, each of said Wiener-like filters and said tracking means for refreshing contents thereof with information relating to an earlier bit period, said memory being arranged in combination with said integrating means to generate contributions to the detected symbol associated with each of a plurality of temporal displacements throughout a predetermined delay spread, the arrangement in effect providing a serial Rake receiver.

12. An apparatus for use in equipment providing a digital radio link using direct sequence spread spectrum signals between a fixed radio unit and a mobile radio unit, said apparatus comprising first and second digital filter means for a pilot signal and for a data signal, respectively, each of said first and second digital filter means receiving inphase and quadrature phase components of an input signal, said first digital filter means for handling the pilot signal having first and second outputs connected to first and second Wiener-like filters, respectively, the first Wiener-like filter having an output connected to a first input of a first multiplying means and to first and second inputs of a second multiplying means, said second Wiener-like filter having an output connected to a first input of a third multiplying means and to first and second inputs of a fourth multiplying means, said second digital filter means for handling the data signal having first and second outputs connected via first and second delay means, respectively, to second inputs, respectively, of said first and third multiplying means, an output of said first multiplying means and an output of said third multiplying means being connected to first and second inputs, respectively of a first adder means, said first adder means having an output connected to a switching arrangement, said second and fourth multiplying means each having an output connected to a respective input of a second adder means, an output of which is connected to an input of a tracking means, said tracking means being connected to threshold means arranged to control said switching arrangement, and upon operation of said switching arrangement the output from said first adder means is applied to an input of integrating means which generates a detected data output signal.

13. The apparatus as claimed in claim 12, wherein the apparatus is arranged to handle binary phase shift keying signals.

14. The apparatus as claimed in claim 13, wherein a memory means is connected to each of said delay means, each of said Wiener-like filters and said tracking means for refreshing content thereof with information relating to an earlier bit period, said memory being arranged in combination with said integrator means to generate contributions to the detected output signal associated with each of a plurality of temporal displacements throughout a predetermined delay spread.

15. The apparatus as claimed in claim 13, wherein each of the Wiener-like filters are dual pass Wiener-like filters.

16. An apparatus for use in equipment providing a digital radio link using multi level differential phase shift keying signals between a fixed radio unit and a mobile radio unit, said apparatus comprising a digital matched filter means arranged to receive inphase and quadrature phase components of an input signal, said digital matched filter means having a first output line connected to a first input of first multiplying means and to a first input of a first complex linear multiplying means via a first delay means, said digital matched filter having a second output line connected to a first input of a second multiplying means and to a second input of said first complex linear multiplying means via a second delay means, said first complex linear multiplying means having first and second outputs connected to respective input of first and second Wiener-like filter respectively, said first and second Wiener-like filters having respective outputs connected to respective second inputs of said first and second multiplying means, respective outputs of said first and second multiplying means being connected to respective inputs of a second complex linear multiplying means via respective third and fourth delay means and to a respective switching arrangement, said second complex linear multiplying means having first and second outputs connected to a first adder means, an output of which being connected to an input of tracking means, an output from said tracking means being connected to a threshold device that provides an output signal for controlling said switching arrangement, said switching arrangement being caused to operate to switch respective outputs of said first and second multiplying means to respective inputs of first and second integrating means which operate to generate data signals representative of a detected symbol, said first and second integrating means having respective outputs connected to a differential decode circuit which generates a data output signal, said outputs of said first and second integrating means being further connected to respective inputs of circuit means arranged to normalize amplitude and threshold to a nearest phase in alphabet and to generate output signals for processing by conjugate circuit means, said conjugate circuit means acting in combination with said circuit means to generate feedback control signals which are applied to two further inputs respectively of said first complex linear multiplying means and said second complex linear multiplying means.

17. The apparatus as claimed in claim 16, wherein said second complex linear multiplying means and said third and fourth delay means are replaced by two further multiplying means each arranged to receive at respective inputs thereof the respective outputs of said first and second Wiener-like filters.

18. The apparatus as claimed in claim 17, wherein a memory means is connected to each of said delay means, each of said Wiener-like filters and said tracking means for refreshing content thereof with information relating to an earlier bit period, said memory being arranged in combination with said integrator means to generate contributions to the detected symbol associated with each of a plurality of temporal displacements throughout a predetermined delay spread.

19. The apparatus as claimed in claim 16, wherein a memory means is connected to each of said delay means, each of said Wiener-like filters and said tracking means for refreshing content thereof with information relating to an earlier bit period, said memory being arranged in combination with said integrator means to generate contributions to the detected symbol associated with each of a plurality of temporal displacements throughout a predetermined delay spread.

20. The apparatus as claimed in claim 16, wherein each of the Wiener-like filters are dual pass Wiener-like filters.

21. An apparatus for use in equipment providing a digital radio link using direct sequence spread spectrum multiple phase shift keyed radio signals between a fixed radio unit and a mobile radio unit, said apparatus comprising a Rake receiver having at least one Rake finger to which the received spread spectrum radio signals are fed, said Rake finger comprising: a first digital filter means for a pilot signal and a second digital filter means for a data signal, each of said first and second digital filters receiving both inphase and quadrature phase components of an input signal, said first digital filter handling said pilot signal having first and second outputs connected to respective inputs of first and second Wiener-like filters respectively, an output of said first Wiener-like filter connected to a first input of a first multiplying means and to first and second inputs of a second multiplying means, an output of said second Wiener-like filter connected to a first input of a third multiplying means and to first and second inputs of a fourth multiplying means, said second digital filter handling said data signal having first and second outputs respectively connected via first and second delay means to second inputs, respectively of said first and third multiplying means respectively, respective outputs of said first and third multiplying means being connected to respective inputs of a switching arrangement respectively, said second and fourth multiplying means having respective outputs connected to respective inputs of adder means respectively, an output of which is connected to tracking means, an output of said tracking means being applied to a threshold device which generates an output signal for controlling said switching arrangement, said switching arrangement causing said outputs from said first and third multiplying means to be respectively connected to respective inputs of first and second integrating means respectively, each of said first and second integrating means having an output connected to circuit means which selects a closest phase in alphabet to generate a detected data output signal.

22. The apparatus as claimed in claim 21, wherein a memory means is connected to each of said delay means, each of said Wiener-like filters and said tracking means for refreshing content thereof with information relating to an earlier bit period, said memory being arranged in combination with said integrator means to generate contributions to the detected symbol associated with each of a plurality of temporal displacements throughout a predetermined delay spread.

23. The apparatus as claimed in claim 21, wherein each of the Wiener-like filters are dual pass Wiener-like filters.

* * * * *